Patented Mar. 10, 1936

2,033,281

UNITED STATES PATENT OFFICE 2,033,281

SYNTHETIC RESIN VARNISH COMPOSITIONS

Charles L. Gabriel, Lawrence, N. Y., assignor, by mesne assignments, to Resinox Corporation, New York, N. Y., a corporation of Delaware No Drawing. Application May 11, 1931. Serial No. 536,690

3 Claims. (Cl. 134—26)

The present invention relates to improvements in synthetic resin compositions. More particularly it relates to resinous compositions of improved properties which are especially valuable in varnishes.

Attempts have been made in the past to prepare varnishes from synthetic resins such as the phenol-aldehyde type by incorporating such resins in suitable solvents. Such solutions are used either for coating surfaces, as of furniture and floors, or for impregnating materials like absorbent paper for the purpose of preparing punch stock. In the latter case a laminated product is prepared from the impregnated paper by curing under pressure at an elevated temperature. The product should be flexible and capable of being cut or having holes punched in it without cracking, checking, or otherwise becoming defective and unsightly. Ordinarily, however, these defects will be encountered and render the article unsuited for many purposes. Difficulties of a similar nature will also be encountered where the resins are used for coatings or for molded articles.

It has now been discovered that by incorporating in such varnishes compounds of the general type of esters resulting from the reaction of polybasic acids partly with dihydric alcohols such as glycol and partly with a monohydric alcohol, the difficulties just enumerated are entirely overcome. In addition, these compounds serve other useful purposes which will become apparent later.

Esters of the type contemplated are represented by the formulæ:

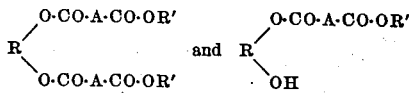

where A represents the radicle of a polybasic acid, R the radicle of a dihydric alcohol (glycol), and R' the radicle of a monohydric alcohol. It is thus seen that the esters referred to in this specification and in the appended claims are those in which the carboxyl groups of the polybasic acid are completely esterified.

Compounds of this type may be synthesized in a number of ways. For example, a polybasic acid may be mixed with proportionate quantities of glycol and a monohydric alcohol, and the resulting mixture heated in the presence of an esterification catalyst. Preferably, the glycol is first reacted with the polybasic acid and the product thus obtained reacted with a monohydric alcohol in the presence of an esterification catalyst. Still other methods may, of course, be employed if desired.

The following specific example will illustrate a method by which these compounds may be satisfactorily produced:

Example 150 grams of phthalic anhydride are heated with 30 grams of glycol. The temperature is raised to 180° C., after which the mixture is allowed to cool. 100 grams of normal butyl alcohol and 7 grams of sulphuric acid are then added, and the mixture is heated to distill off the butyl alcohol, which carries with it the water formed during esterification. When about 30 c. c. of distillate has been cooled, 50 c. c. of fresh butyl alcohol is added and distillation is continued until the lower layer of condensate contains about 24 c. c. The product is washed with water, neutralized with sodium carbonate solution, washed again and dried by heating in vacuo to 180° C. to remove low boiling impurities. The glycol butyl phthalate thus produced is a light yellow viscous oily material that can not be distilled without decomposition.

Other similar compounds which may be obtained by slight modifications of the procedure just set forth are: glycol propyl phthalate, glycol benzyl phthalate, and similar esters of other polybasic acids such as terephthalic acid, tartaric acid, citric acid, and the like. Other monohydric alcohols may also, of course, be substituted for those cited as examples. Compounds of the type contemplated, therefore, may be designated as esters resulting from the reaction of polybasic acids partly with a dihydric alcohol such as glycol and partly with a monohydric alcohol, one or both of the hydroxyl radicles of the glycol being combined with carboxyl groups of the acid and more than one molecule of the acid may be present in the ester. Examples of other suitable dihydric alcohols are: propylene glycol, butylene glycol, etc.

Esters of the type set forth above are viscous, non-volatile liquids of high molecular weight, and as previously indicated, particularly well suited for use with synthetic resins such as phenol-aldehyde, urea-formaldehyde, etc. in the preparation of punch stock molded products, varnishes, etc. The esters in question are compatible with the resins and soluble in the usual solvents such as alcohol, acetone, benzol, etc., used in the production of resinous varnishes. In preparing a varnish, generally 20–40 parts of an ester of the type described, as for example, glycol butyl phthalate, to 100 parts by weight of a resin of the heat-hardening type such as phenol-formaldehyde resin, may be incorporated in a suitable solvent or solvent mixture of the usual type, as for example, methyl or ethyl alcohols, acetone, methyl ethyl ketone, ethyl acetate, benzol, etc. Generally about 20 parts by weight of solvent to 80 parts by weight of ester-resin mixture will give a satisfactory varnish of suitable consistency. It is of course possible to vary considerably the proportions set forth above without leaving the scope of the present invention.

Varnishes of the type hereinabove described may be applied by the usual means, directly to wood, metal, paper, cloth, etc., and are particularly well suited to the production of laminated sheets and similar articles, the sheets thereby obtained being flexible and at the same time tough and resistant to deformation except where excessive quantities of the ester have been employed.

After applying the varnish, the coated material is allowed to dry at ordinary drying temperatures, say approximately 80° C., until the solvents and any moisture present have been evaporated. This temperature and the time of drying may, of course, be varied considerably depending upon the general operating conditions and the character of the product desired. The temperature is next preferably raised for a time to 125–175° C. so as to convert the resin into the infusible and unreactive form. It is customary also in the case of laminated and molded products to subject the article being heated to pressures in the neighborhood of 2000 pounds per square inch. This, however, may also be varied considerably depending upon the particular conditions under which it is desired to work and the article to be produced.

If desired, the mixed esters hereinabove referred to, may be incorporated with the resin without the aid of solvents. The product thus obtained may be subjected to heat and pressure as previously indicated to form molded products and the like.

What is claimed is:

1. A coating composition consisting essentially of a heat-hardening synthetic resin, a liquid condensation product resulting from the complete esterification of phthalic acid partly with ethylene glycol and partly with butyl alcohol, and a volatile solvent for said resin and condensation product, in such proportions as to produce a liquid of varnish consistency and capable of forming a homogenous, flexible, and tough film.

2. A coating composition consisting essentially of 100 parts of a heat-hardening synthetic resin, 20 to 40 parts of a liquid condensation product resulting from the complete esterification of phthalic acid partly with ethylene glycol and partly with butyl alcohol, and a volatile solvent for said resin and condensation product, in such proportion as to produce a liquid of varnish consistency.

3. A coating composition consisting essentially of a heat-hardening synthetic resin, a liquid condensation product resulting from the esterification of a polybasic aromatic acid chosen from the group consisting of phthalic acid and terephthalic acid, partly with a dihydric alcohol chosen from the group consisting of ethylene, proplene, and butylene glycols, and partly with a monohydric alcohol, the carboxyl group of said polybasic acid being substantially completely esterified, and a volatile solvent for said resin and condensation product, in such proportions as to produce a liquid of varnish consistency and capable of forming a homogenous, flexible and tough film.

CHARLES L. GABRIEL.